March 24, 1931.  A. MEYER  1,797,783
GAS TURBINE PLANT
Filed Oct. 15, 1928
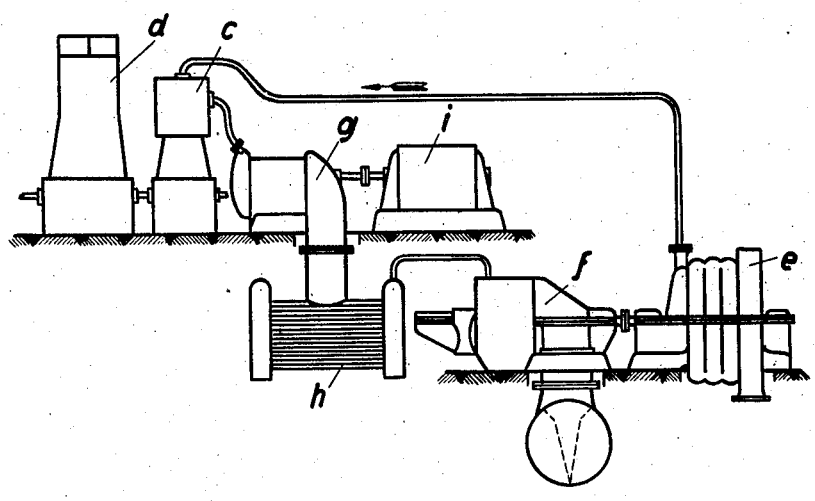
A. Meyer INVENTOR
By Mark H Ellis Attys.

Patented Mar. 24, 1931

1,797,783

UNITED STATES PATENT OFFICE

ADOLF MEYER, OF KUSNACHT, NEAR ZURICH, SWITZERLAND, ASSIGNOR TO AKTIEN-GESELLSCHAFT BROWN, BOVERI AND CIE., OF BADEN, SWITZERLAND

GAS-TURBINE PLANT

Application filed October 15, 1928, Serial No. 312,711, and in Germany October 15, 1927.

It has already been proposed to carry out the compression of the combustion air required for the operation of gas turbines in two stages, the compression being effected in the first stage by a rotary compressor driven by a gas turbine, while the compression in the second stage is effected by means of a piston compressor which is driven by a separate reciprocating internal combustion engine.

It has also been proposed to carry out the compression in a single stage by means of a rotary compressor and to drive the latter by means of a steam turbine, the working steam of which is produced by the exhaust gases of a gas turbine in an exhaust gas steam boiler.

The first method has the disadvantage that the rotary compressor is dependent on the speed of revolution of the gas turbine, the speed of revolution of the gas turbine being determined by the electric generator also driven by it and amounting on the continent of Europe to 3,000, 1,500 or 1,000 revolutions per minute, corresponding to the usual periodicity of 50 per second, while it has the advantage that the compression is unlimited. The second method has the disadvantage that the degree of the total compression is limited by the fact that the energy required for starting the compressor is determined by the quantity and temperature of the exhaust gases which generate the steam for the driving steam turbine. This method, however, has the advantage of independence as regards the speed of revolution for driving the rotary compressor which requires a higher speed of revolution lying as a rule far above the highest possible speed of revolution of the gas turbine or the electric generator, which amounts to 50 per second.

The present invention has for its object to unite the advantages of both methods while avoiding their disadvantages. The drawing shows an application of the combined method. It consists in this, that the precompression is effected by a rotary compressor $e$ which is driven by a steam turbine $f$, the steam of which is generated in an exhaust gas boiler $h$ by the exhaust gases of the gas turbine $g$ which is coupled to an electric generator $i$, and that the final compression is effected by means of a piston compressor $c$ which is driven by a separate reciprocating internal combustion engine $d$. This makes it possible to select for the precompression a speed of revolution which is suitable both for the driving steam turbine $f$ and for the rotary compressor $e$, whereby in the first place both the turbine and the compressor become cheaper and in the second place their efficiency is increased which is of decisive importance for the total efficiency of the gas turbine process. The exhaust gases of the exhaust turbine will then perform by way of the boiler and the steam turbine that portion of the compression work which is suited to their capacity, while no limits are set to the final compression, as this is effected by the independent reciprocating internal combustion engine, the power of which is made such that the final pressure reaches the most favourable value for the power process.

What I claim is:

A gas turbine plant including a gas turbine, a separate reciprocating internal combustion engine, a rotary compressor and a piston compressor working in series for effecting the compression of air for the gas turbine in two stages, the piston compressor being driven by the reciprocating internal combustion engine, a steam turbine driving the rotary compressor, and a boiler for the steam turbine heated by the exhaust gas of the gas turbine.

In testimony whereof I have signed my name to this specification.

ADOLF MEYER.